US012811340B2

(12) United States Patent
Kopperud

(10) Patent No.: US 12,811,340 B2
(45) Date of Patent: Nov. 24, 2026

(54) CONNECTOR ASSEMBLY

(71) Applicant: DEFA AS, Nesbyen (NO)

(72) Inventor: Agnar Kopperud, Asker (NO)

(73) Assignee: DEFA AS, Nesbyen (NO)

( * ) Notice: Subject to any disclaimer, the term of this patent is extended or adjusted under 35 U.S.C. 154(b) by 316 days.

(21) Appl. No.: 18/722,031

(22) PCT Filed: Dec. 20, 2022

(86) PCT No.: PCT/NO2022/050318
§ 371 (c)(1),
(2) Date: Jun. 20, 2024

(87) PCT Pub. No.: WO2023/121473
PCT Pub. Date: Jun. 29, 2023

(65) Prior Publication Data

US 2025/0070505 A1 Feb. 27, 2025

(30) Foreign Application Priority Data

Dec. 23, 2021 (NO) .................................... 20211582

(51) Int. Cl.
*H01R 13/635* (2006.01)
*H01R 13/52* (2006.01)
(Continued)

(52) U.S. Cl.
CPC ..... *H01R 13/6271* (2013.01); *H01R 13/5205* (2013.01); *H01R 13/635* (2013.01);
(Continued)

(58) Field of Classification Search
None
See application file for complete search history.

(56) References Cited

U.S. PATENT DOCUMENTS 4,682,847 A * 7/1987 Moore ............. H01R 13/62933 439/372
6,225,153 B1 5/2001 Neblett
(Continued)

FOREIGN PATENT DOCUMENTS

CN 209071725 U 7/2019
CN 108749610 B 6/2020
(Continued)

OTHER PUBLICATIONS

International Search Report and Written Opinion mailed Feb. 10, 2023, directed to International Application No. PCT/NO2022/050318; 10 pages.
(Continued)

*Primary Examiner* — Tho D Ta
(74) *Attorney, Agent, or Firm* — Morrison & Foerster LLP

(57) ABSTRACT

A connector assembly comprises a connector body configured for insertion into a receptacle; a cable having one or more electrical connector members; a first and a second housing part configured for connection to each other and to respective portions of the connector body and the cable to form a housing; a latch member having a detent configured for releasable interconnection with a catch member in said receptacle; and a trigger having a user interface portion and comprising first support means for rotatable installation in corresponding trigger supports in the first housing part and first shaped portions. The latch member comprises second support means for rotatable installation in corresponding latch supports in the second housing part and second shaped portions. The first and second shaped portions are configured for movable connection, wherein rotational movement of the trigger causes rotational movement of the latch member, and vice versa.

10 Claims, 8 Drawing Sheets

(51) Int. Cl.

| | |
|---|---|
| ***H01R 13/627*** | (2006.01) |
| ***H01R 13/70*** | (2006.01) |
| ***H01R 43/20*** | (2006.01) |
| *H01R 24/20* | (2011.01) |

(52) U.S. Cl.

CPC ............. *H01R 13/70* (2013.01); *H01R 43/20* (2013.01); *H01R 24/20* (2013.01)

(56) References Cited

U.S. PATENT DOCUMENTS

| | | | | |
|---|---|---|---|---|
| 7,963,793 | B2 * | 6/2011 | Poulin | H01R 13/6275 439/372 |
| 8,016,607 | B2 * | 9/2011 | Brown, II | H01R 13/502 439/353 |
| 9,124,035 | B2 * | 9/2015 | Ohmura | H01R 13/6275 |
| 9,246,270 | B2 * | 1/2016 | Toratani | B60L 53/16 |
| 9,509,095 | B2 * | 11/2016 | Ohmura | B60L 53/16 |
| 10,630,029 | B2 * | 4/2020 | Beimdieck | B60L 53/16 |
| 2010/0197171 | A1 | 8/2010 | Matsumoto | |
| 2011/0171850 | A1 | 7/2011 | Brown, II | |
| 2012/0126747 | A1 | 5/2012 | Kiko | |
| 2012/0315801 | A1 | 12/2012 | Kwasny | |
| 2015/0207261 | A1 | 7/2015 | Fukushima | |
| 2015/0249305 | A1 * | 9/2015 | Toratani | H01R 13/641 439/357 |
| 2015/0295344 | A1 | 10/2015 | Sawada | |

FOREIGN PATENT DOCUMENTS

| | | | |
|---|---|---|---|
| CN | 111555084 | B | 9/2021 |
| DE | 102009044179 | A1 | 12/2010 |
| JP | 2015-65124 | A | 4/2015 |

OTHER PUBLICATIONS

Norwegian Search Report dated Jul. 23, 2022, directed to NO Application No. 20211582; 2 pages.

* cited by examiner

CONNECTOR ASSEMBLY

CROSS-REFERENCE TO RELATED APPLICATIONS

This application is a U.S. national stage application under 35 U.S.C. § 371 of International Application No. PCT/NO2022/050318, filed Dec. 20, 2022, which claims the priority of NO application No. 20211582, filed Dec. 23, 2021. The entire contents of each priority application is incorporated herein by reference.

FIELD OF THE DISCLOSURE

The invention concerns the field of electrical connectors. More specifically, the invention concerns a connector assembly as set out by the preamble of claim 1, and a method of assembling the invented connector assembly, as set out by the preamble of claim 8.

BACKGROUND OF THE DISCLOSURE

Electrical vehicles (EV) and plug-in hybrid electric vehicles (PHEV) have on-board batteries that must be charged from time to time. Charging is accomplished by means of a connector that is temporarily connected to a receptacle in the vehicle. The connector is connected to an electrical power source via a cable.

In order to prevent the connector from inadvertently becoming disconnected from the receptacle, some connector types are furnished with a mechanical latching mechanism which is operated by the user.

The prior art includes U.S. Pat. No. 8,932,072 B2, which discloses a charging supply connector having a lock lever displaceable between a locking position for engagement with a hook mounted on a charging port, and a lock release position where the lock lever is released from the hook. The lock lever is spring biased to the locking position. A manipulation lever is connected to the lock lever by a link, and is operable to move the lock lever between the locking position and the lock release position. When the lock lever is at the lock release position, the lock lever, the link or the lock lever and the link interferes with an operation range of a charging start switch, to prevent operation thereof.

The prior art also includes U.S. Pat. No. 8,016,607 B2, which discloses a connector assembly provided with a housing having an inlet for receiving an electrical harness, and an outlet for engaging a vehicle receptacle for facilitating electrical charging. The housing includes a plurality of transverse support ribs, a fulcrum and a series of guides. The housing is configured for supporting a distributed load. A latching mechanism, including a lever, linkage and trigger, is externally connected to the housing for selectively attaching the housing to the vehicle receptacle. The lever is pivotally connected to the fulcrum. The linkage is coupled to the lever for pivoting the lever. The trigger is mounted for translation and includes a series of apertures each sized for receiving one of the guides. The trigger actuates the linkage.

The prior art also includes U.S. Pat. No. 10,644,444 B2, which discloses a connector having a housing, at least one electrical contact element arranged on a plug-in portion and for electrically contacting the mating plug-in connector part; a locking element that is movably arranged on the housing, the locking element having a locking position for locking the plug-in connector part with respect to the mating plug-in connector part in the connected position, and being movable out of the locking position to unlock the connection between the plug-in connector part and the mating plug-in connector part; and a pressing element movably arranged on the housing, the pressing element being actuable in a first actuation direction.

The prior art also includes US 2011/0070758 A1, which discloses a charge handle for use in charging a plug-in vehicle having a charge port. The charge handle includes a body having a receptacle for engaging the charge port to provide for charging the vehicle. A latch rotatably mounted to the body has a first end for securing the engagement of the receptacle to the charge port, and has a second end. An actuator lever is rotatably mounted to the body. The actuator lever has a first end connected to the second end of the latch, and has a second end. A trigger mechanism includes a trigger located on the opposite side of the body from the latch. The trigger mechanism is arranged such that depressing the trigger pushes the second end of the actuator lever to rotate the actuator lever to cause the latch to rotate and disengage the receptacle from the charge port.

The prior art also includes U.S. Pat. No. 6,225,153 B1, US2011171850 A1, U.S. 2010197171 A1, US2015207261 A1, and US2015295344 A1.

It is a need for an improved connector assembly that comprises few parts, is easy to assemble, reliable in use, and separates the mechanical parts from electrical cables and electronics components.

SUMMARY OF THE DISCLOSURE

The invention is set forth and characterized in the main claims, while the dependent claims describe other characteristics of the invention.

It is thus provided a connector assembly, comprising:

- a connector body configured for insertion into a receptacle;
- a cable having one or more electrical connector members, and the connector body is configured for receiving the one or more connector members;
- a first housing part and a second housing part configured for connection to each other and to respective portions of the connector body and the cable to form a housing of the connector assembly;
- a latch member having an arm portion with a catch at its free end, said catch being configured for releasable interconnection with a detent member in said receptacle, said latch member being movable between a locking position and a releasing position; characterized by:
- a trigger having a user interface portion, and comprising first support means for rotatable installation in corresponding trigger supports in the first housing part;
- the latch member comprising second support means for rotatable installation in corresponding latch supports in the second housing part;
- the trigger comprising two trigger sections that extend upwards from the user interface portion and define a first cavity, wherein the trigger sections (31*a,b*) comprise respective first shaped portions at their upper ends;
- the latch member comprising two latch sections that extend downwards from the arm portion and define a second cavity, wherein the latch sections comprise respective second shaped portions at their lower ends;
- said first and second shaped portions having complementary surfaces and configured for movable abutting connection when the connector assembly is assembled, and thereby defining rotatable joints;

whereby rotational movement of the trigger causes rotational movement of the latch member, and vice versa.

In one embodiment, the connector assembly comprises a grommet which is connected to a portion of the cable and to a portion of the connector body and encloses said electrical connector members and other electrical components inside the connector assembly. The joints are arranged outside the grommet.

In one embodiment, the trigger comprises a first cavity configured for receiving at least a portion of said grommet, and said joints are formed on each side of the grommet.

In one embodiment, the connector assembly comprises a biasing member configured for forcing the latch member towards the locking position.

In one embodiment, the first and second housing parts are lower and upper housing parts when the connector assembly is inserted into a receptacle, and the lower housing part comprises an opening (19) which configured for receiving at least a portion of the user interface portion, said opening is facing downwards when the connector assembly is inserted into a receptacle.

In one embodiment, the connector assembly further comprises a printed circuit board (PCB) configured for controlling electrical power and signals, a switch configured for operating the PCB, and a plunger for activating the switch, and wherein the arm portion comprises a switch activation member configured for operating the PCB by pressing the plunger.

It is also provided a method of assembling the invented connector assembly, comprising installing the trigger in the first housing part; connecting the electrical connector members to the cable and the connector body to form a unit; arranging said unit in the first housing part; installing the latch member in the second housing part; and connecting the first and second housing parts.

In one embodiment of the method, the arranging step comprises arranging a portion of said unit in the first cavity. The method may also comprise enclosing the electrical connector members, a portion of the connector body, and a portion of the cable by a grommet.

BRIEF DESCRIPTION OF THE FIGURES

These and other characteristics of the invention will become clear from the following description of an embodiment of the invention, given as a non-restrictive example, with reference to the attached schematic drawings, wherein:

FIG. 6A and FIG. 6B are a side view and a rear view, respectively, of the parts illustrated in FIG. 5, while

DETAILED DESCRIPTION OF THE DISCLOSURE

Figure 1:
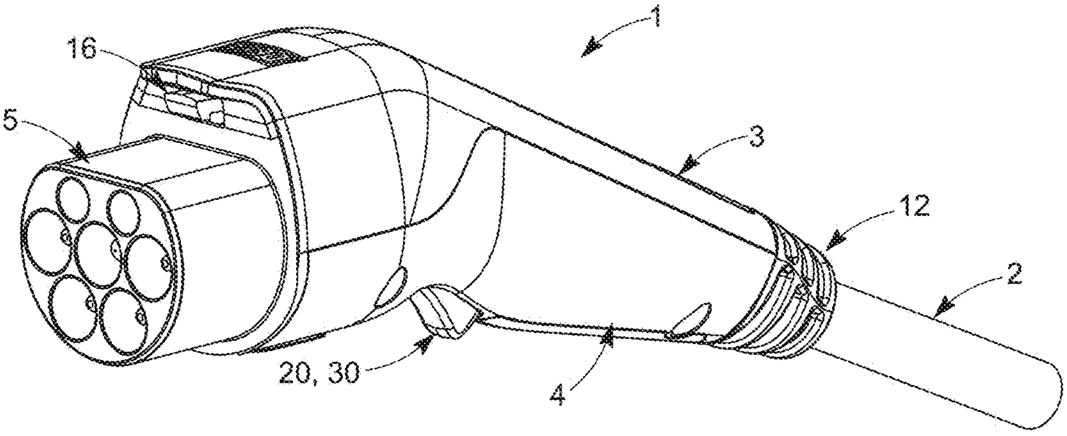
FIG. 1 is a perspective view of an embodiment of the connector assembly according to the invention, illustrated in an unactuated (locking) state.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 2:
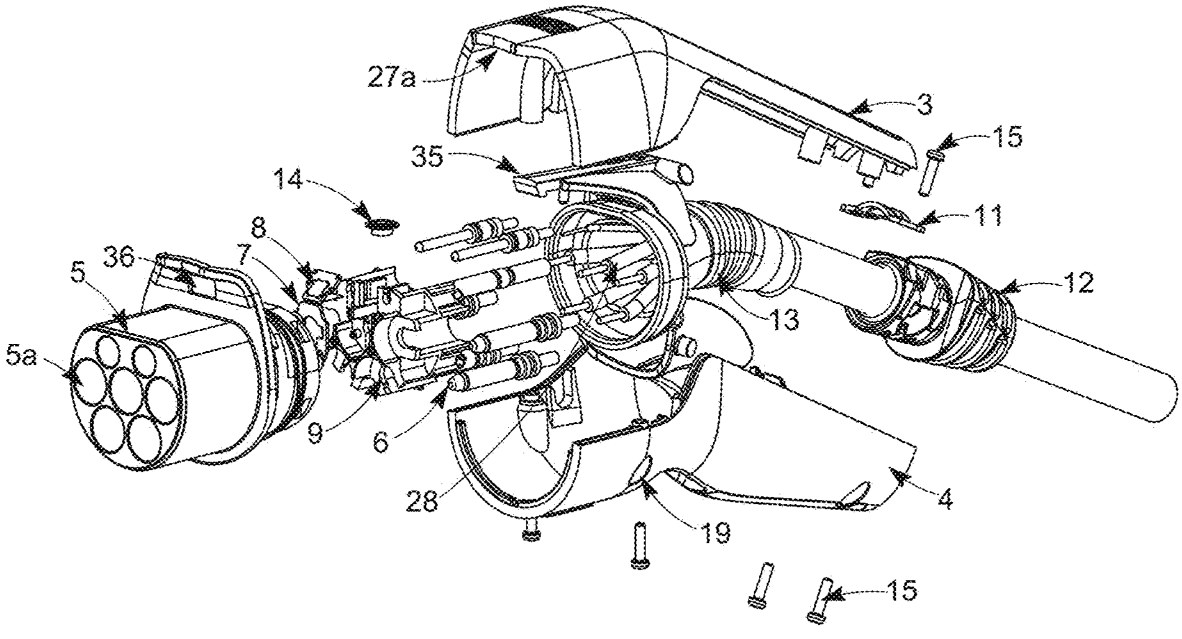
FIG. 2 is an exploded perspective view of the embodiment of the connector assembly illustrated in FIG. 1.
Figure 3:
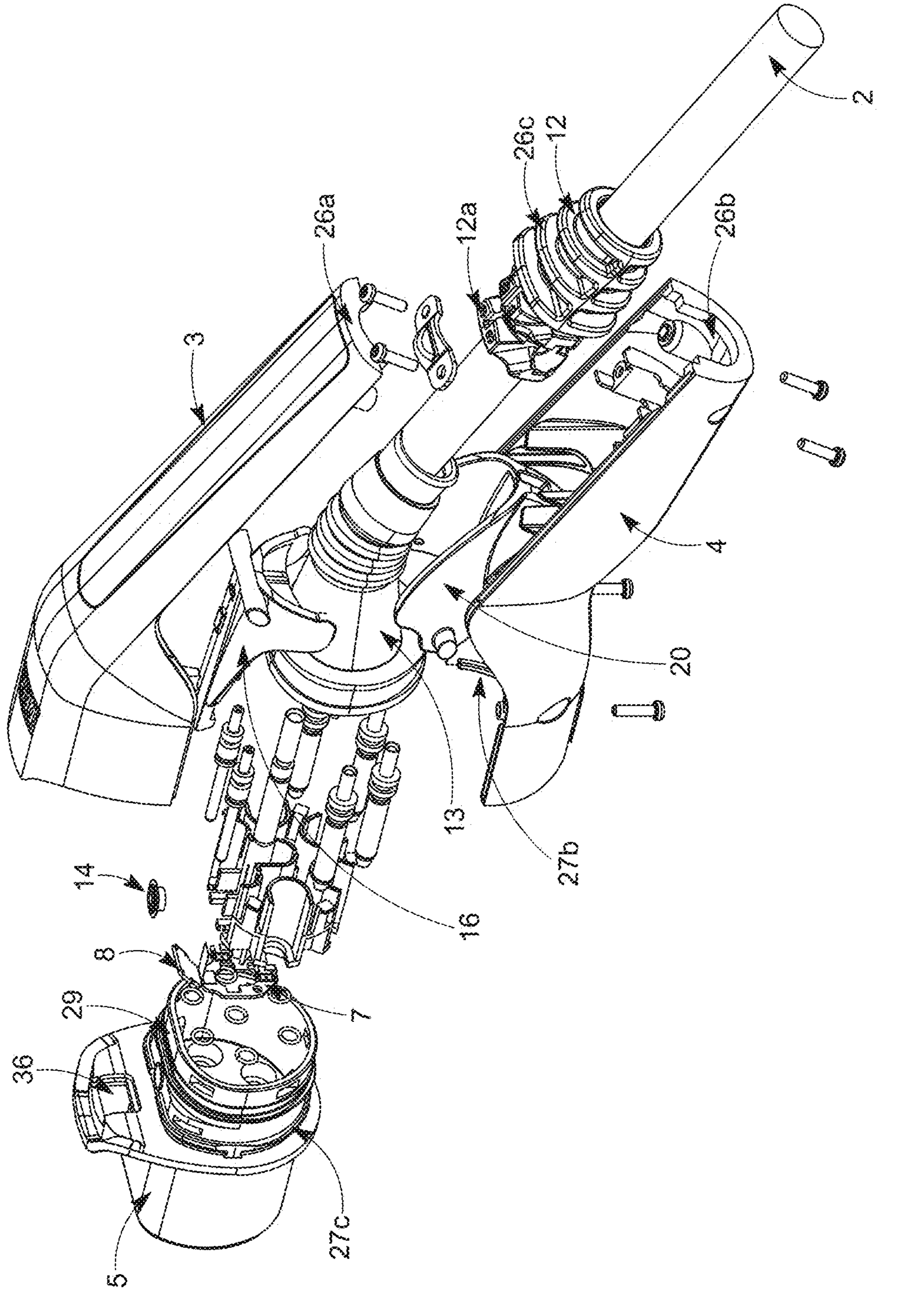
FIG. 3 corresponds to FIG. 2, but illustrates the connector assembly from a different perspective.

FIG. 1 illustrates an embodiment of the connector assembly 1 according to the invention, and FIGS. 2 and 3 are exploded views of the connector assembly illustrated in FIG. 1.

It its forward end, the connector assembly 1 comprises a connector body 5 having openings **5*a* for electrical connector members (e.g. pins) 6 that are connected to individual wires or cables 28 in a cable 2. When assembled, the connector pins are supported by a connector support member 9 and extend into the openings 5*a*. A printed circuit board (PCB) 7 is arranged on the support member to control the electrical power and signals in the cables 28. The PCB is operated by a PCB switch 8, which is activated by a plunger 14. These devices are commonly known in the art, and need therefore not be described in detail here. The connector body 5 is configured for connection to a receptacle (not shown), for example in an electric vehicle (EV). The connector assembly 1 may be a so-called Type 2 connector assembly, used for charging electric vehicles, but the invention shall not be limited to this type. The cable 2 may this be referred to a charger cable, containing power cables and signal cables. It should be understood, however, that the invention is not limited to use for charging an EV, nor to a Type 2** connector.

The cable 2 extends through a cable grommet, in the following also referred to as a cable bend relief member, 12 and is fixed to a first (in the figure: lower) housing part 4 via a cable strain relief member 11 and screws 15, in the illustrated embodiment via a portion **12*a* of the cable bend relief member 12 (see FIG. 3). The first housing part 4 is secured to a second (in the figure: upper) housing part 3 by means of screws 15. It shall be understood that connection devices other than screws may be used to interconnect the housing parts. A rear portion of the upper housing part 3 comprises interface structures 26*a* and the rear portion of the lower housing part 4 comprises interface structures 26*b*. These rear interface structures 26*a,b* are configured for locking interconnection with complementary geometry (e.g. ridges and recesses) 26*c* on the cable bend relief member 12. A forward portion of the upper housing part 3 comprises interface structures 27*a* and the forward portion of the lower housing part 4 comprises interface structures 27*b*. These forward interface structures 27*a,b* are configured for locking interconnection with complementary geometry (e.g. ridges and recesses) 27***c* on the connector body 5. When the upper and lower housing parts 3,4 are interconnected, the rear interface structures 26*a,b* interconnect with the geometry 26*c* on the cable bend relief member 12, and the forward interface structures 27*a,b* interconnect with the complementary geometry 27*c* on the connector body 5. The upper and lower housing parts 3,4 thus form a rigid housing and a rigid connection between the cable bend relief member 12 and the connector body 5. The lower housing part 4 comprises an opening 19, the purpose of which is described below. The upper housing part 3 has no openings, whereby water ingress into the connector assembly is prevented. The interface between the interconnected upper and lower housing parts is clearly seen in FIG. 1, as a line running along the side of the connector assembly. Although not illustrated, water ingress prevention may be further enhanced by applying seals, gaskets or sealing compounds between the upper and lower housing parts, and between respective portions of the housing parts and the connector body 5 and the cable bend relief member 12.

Figure 8:
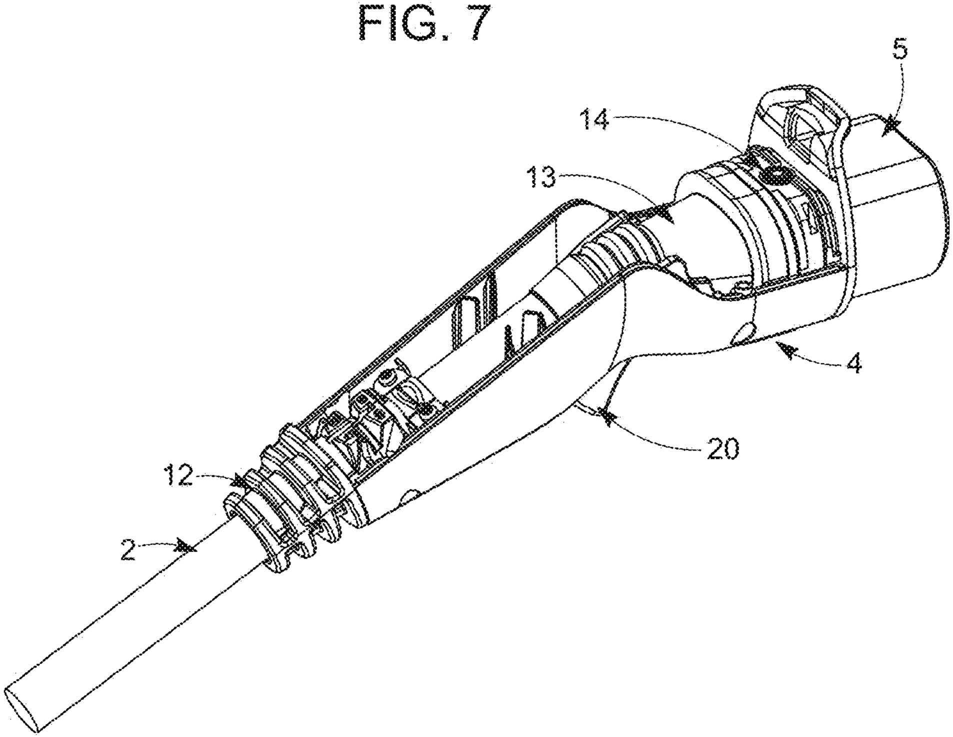
FIG. 8 is a perspective view of the connector assembly illustrated in FIGS. 1-3, without the upper housing and latch.

As described above, the bundle of cables or wires 28 contained within the cable 2 are connected to respective connector pins 6, that are supported by the connector support member 9. This assembly is housed within a grommet 13 through which the cable 2 extends. A forward end (as seen in i.a. FIG. 2) of the grommet 13 comprises an interface geometry (e.g. ridges and recesses) 13*a* (see FIG. 4B) that is configured for connection to complementary geometry 29 on the connector body 5, preferably behind the geometry 27*c* mentioned above. A rear end of the grommet fits snugly around the cable 2. Therefore, when the connector assembly 1 is assembled, all electrical parts (connector pins 6, PCB 7, PCB switch 8, and cables and wires 28) are contained within the grommet 13 which is sealed to the connector body 5 and to a portion of the cable 2 (inside the upper and lower housing parts). The electrical components are thus sealed from water ingress. This is illustrated in FIG. 8, which shows the connector assembly without the upper housing part. FIG. 8 also shows how the plunger 14 (for activating the PCB switch) is arranged on the outside of the grommet 13. It will be understood that the grommet is manufactured from an elastic, water-impermeable and electrically non-conductive material. The housing parts and connector body are manufactured from rigid materials that provide structural integrity for the connection assembly, as are commonly known in the art.

Figure 4A:
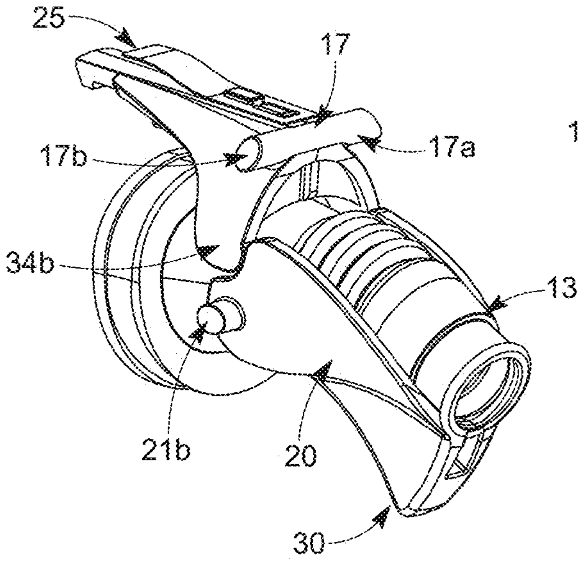
FIG. 4A and FIG. 4B are perspective views of certain parts of the connector assembly illustrated in FIGS. 1-3, more specifically a trigger, a latch, and a grommet.
Figure 4B:
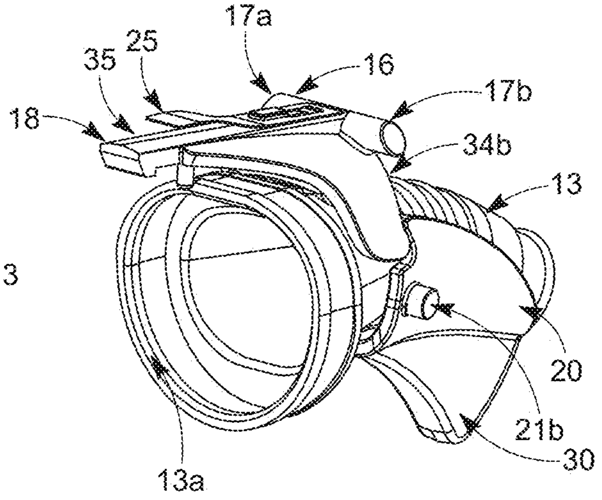
Figure 5:
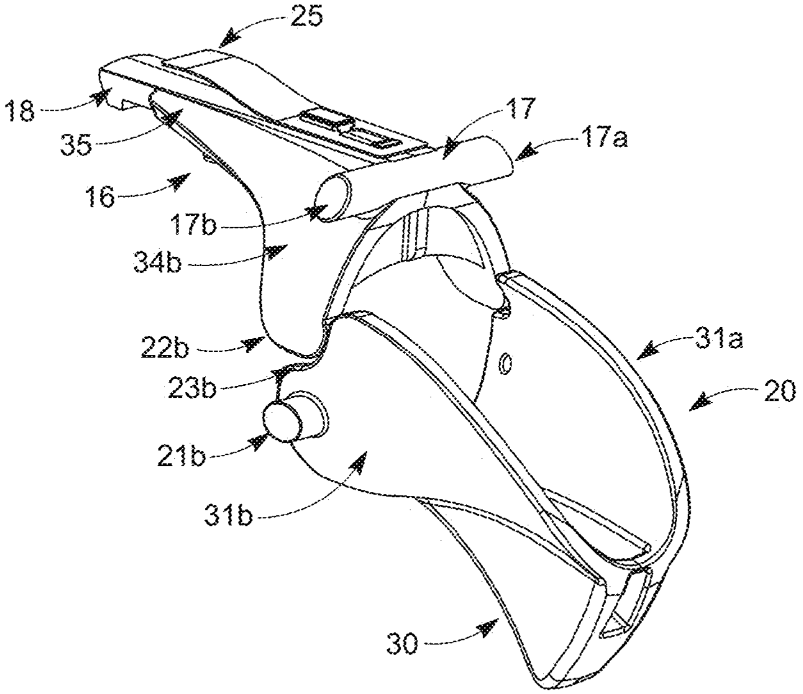
FIG. 5 corresponds to FIG. 4A, but the grommet has been removed.
Figure 6A:
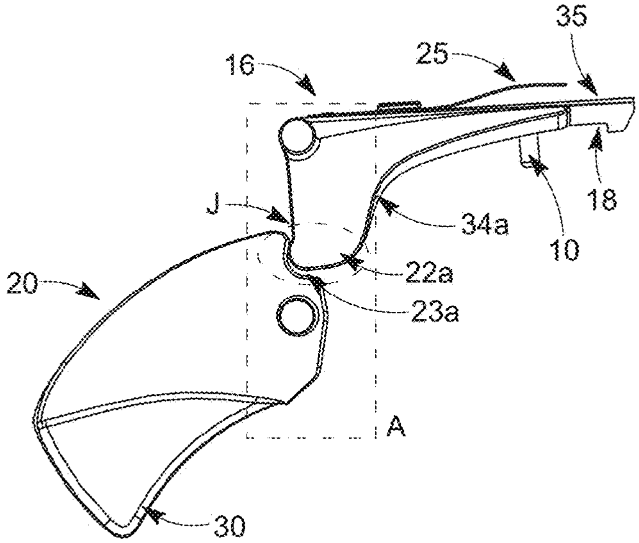
Figure 6B:
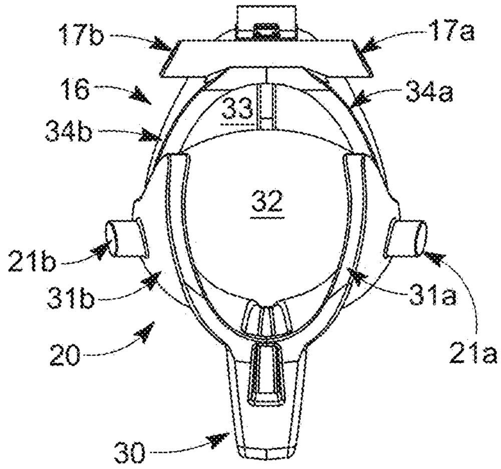

Referring now to FIGS. 4A and 4B, the connector assembly 1 comprises a trigger-and-latch assembly 20, 16 arranged around the grommet-and-connector body assembly 13, 5. The trigger-and-latch assembly 20, 16 serves at least two functions: to prevent the connector assembly 1 from inadvertently becoming disconnected from the receptacle when charging, and activating the PCB switch 8 (via the plunger 14). In the following, reference is also made to FIGS. 5 and 6A-6B.

The trigger 20 comprises a user interface portion 30 that is configured to extend through an opening 19 (see FIG. 7) in the lower housing part 4 when the connector assembly is assembled. The trigger 20 also comprises two trigger sections 31*a,b* that extend upwards from the user interface portion 30 and define a first cavity 32 (see FIG. 6B). The trigger sections 31*a,b* are shaped and dimensioned to straddle the grommet 13, and the first cavity 32 is defined so as to accommodate at least a portion of the grommet 13.

Figure 7:
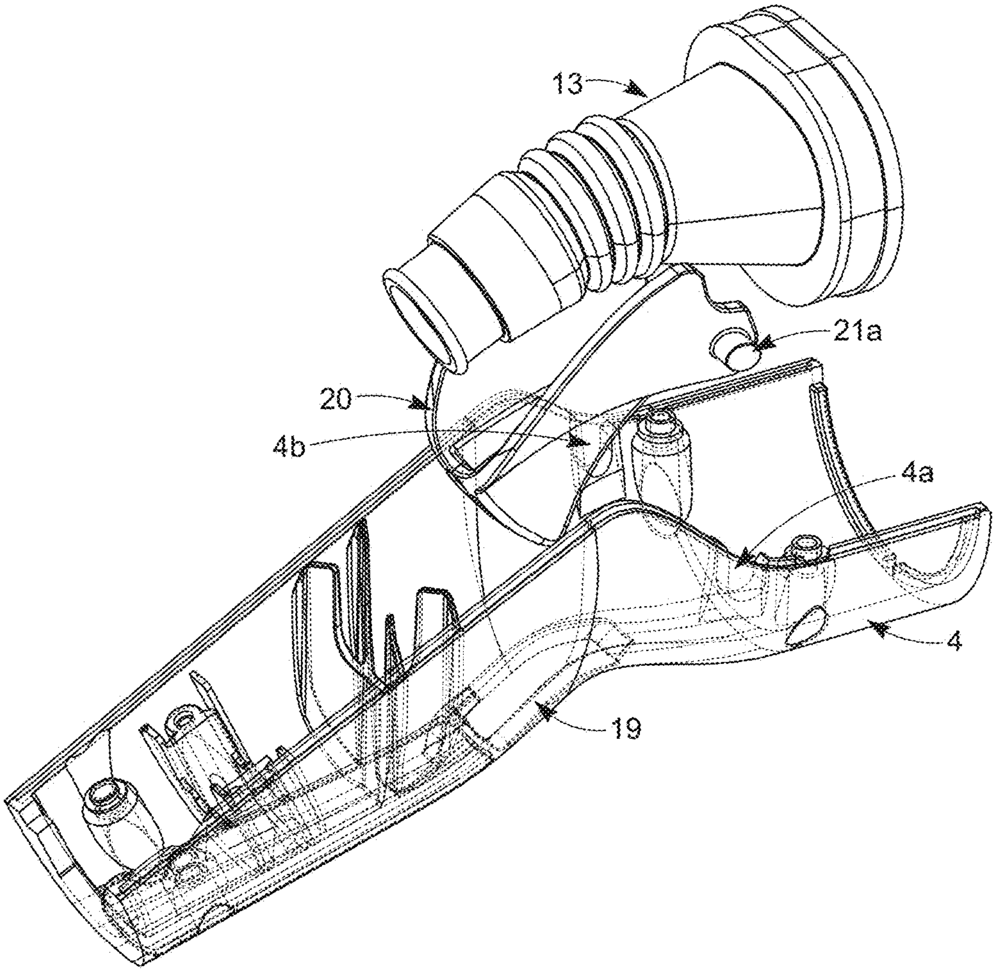
FIG. 7 is an exploded perspective view of certain parts of the connector assembly illustrated in FIGS. 1-3, more specifically a lower housing, a trigger, and a grommet, the lower housing illustrated as partially transparent to illustrate internal features.

The trigger 20 also comprises support means 21*a,b*, whereby the trigger may be rotationally supported by the lower housing part 4 (described in more detail below). In the illustrated embodiment, the trigger support means comprises two trigger support members (e.g. pegs) 21*a,b* arranged on the outer side of a respective one of the trigger sections 31*a,b*. Referring momentarily to FIG. 7, the trigger 20 may be rotatably supported by respective trigger supports 4*a,b* in the lower housing part 4.

The latch member 16 comprises an arm portion 35 having a catch 18 at its free end. The arm portion free end is configured to extend through an opening 36 (see FIG. 2) in the connector body 5 when the connector assembly is assembled, such that the catch 18 may engage a corresponding detent in the receptacle (not shown) when charging is taking place. The latch member 16 also comprises two latch sections 34*a,b* that extend downwards from the arm portion 35 and define a second cavity 33 (see FIG. 6B). The latch sections 34*a,b* are shaped and dimensioned to straddle the grommet 13, and the second cavity 33 is defined so as to accommodate at least a portion of the grommet 13. As is seen in e.g. FIGS. 4A and 6B, the grommet 13 may extend though the opening defined by the first and second cavities 32, 33, and trigger 20 and latch member 16 movements are not impeded by the grommet 13.

Figure 9:
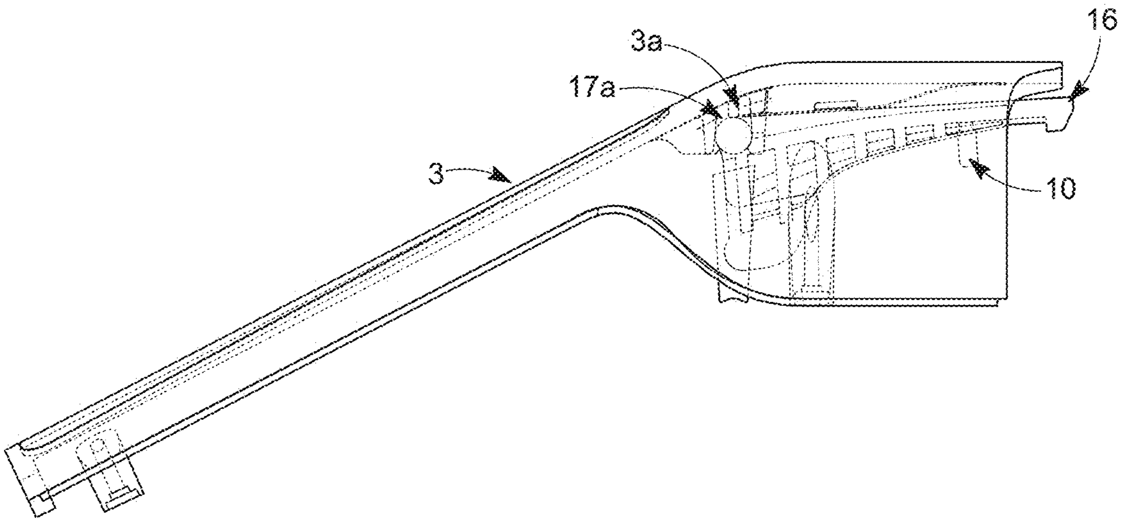
FIG. 9 is a side view of the upper housing and latch, the upper housing illustrated as partially transparent.
Figure 12:
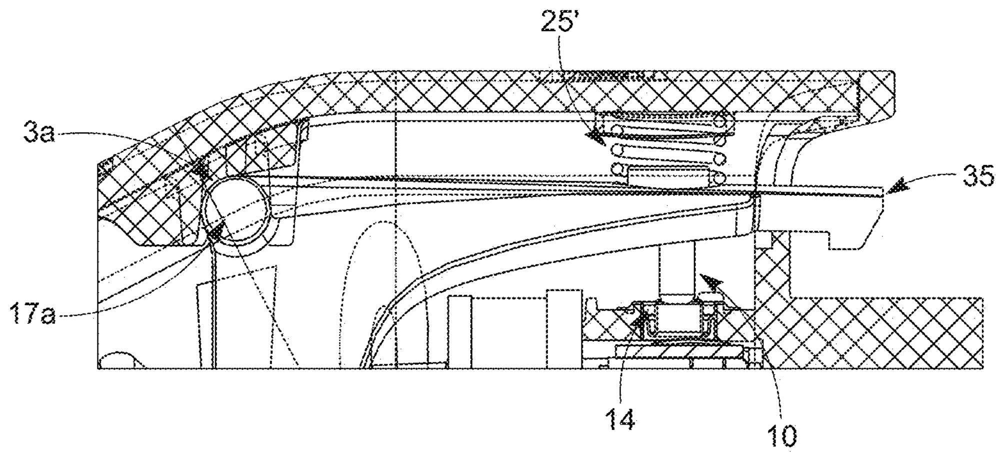
FIG. 12 is an enlarged view of the area "B" in FIG. 10B, but illustrates the biasing member as a coil spring.

The latch member 16 also comprises support means 17, whereby the latch member may be rotationally supported by the upper housing part 3 (described in more detail below). In the illustrated embodiment, the latch support means 17 comprises two latch support members (e.g. pegs) 17*a,b*. Referring momentarily to FIGS. 9 and 12, the latch member 16 may be rotatably supported by respective latch supports 3*a,b* in the upper housing part 3. Although only one latch support 3*a* is illustrated, it shall be understood that a corresponding latch support 3*b* is provided on the opposite side.

Figure 6C:
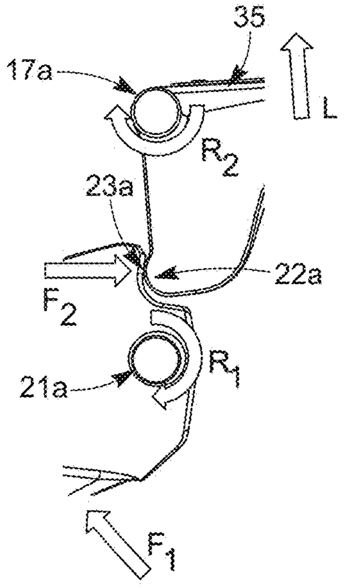
FIG. 6C is an enlarged view of the area "A" in FIG. 6A.

The trigger sections 31*a,b* comprise respective first shaped portions 23*a,b* at their upper ends, and the latch sections 34*a,b* comprise respective second shaped portions 22*a,b* at their lower ends, and The second (latch) shaped portions 22*a,b* and the first (trigger) shaped portions 23*a,b* are rounded with complementary surfaces so as to define rotatable joints J (dotted circle in FIG. 6A) when the connector assembly is assembled and respective pairs of shaped portions 22*a*, 23*a* and 22*b*, 23*b* abut against each other. The shaped portions may comprise a friction-reducing substance. Therefore, with reference to FIGS. 6A and 6C, when the user interface portion 30 is depressed (upwards, towards the lower housing part 4), as indicated by the arrow $F_1$, the trigger 20 will rotate about the trigger support members 21*a,b* ($R_1$) and the first shaped portions 23*a,b* will exert forces $F_2$ on respective second shaped portions 22*a,b*. The exerted forces $F_2$ will cause a rotation $R_2$ about the latch support members (e.g. pegs) 17*a,b* and thus lift the arm portion 35 as indicated by the arrow L. A biasing member 25, such as a spring or other resilient member, is arranged on the upper side of the arm portion 35 and bears against the inside of the upper housing part 3 when assembled. The biasing member will therefore force the arm portion 35 downwards and rotate the latch member 16 when the trigger is released (i.e. the force $F_1$ on the user interface portion 30 is removed).

When the arm portion 35 is lifted (by depressing the user interface portion 30), the connector assembly is in an actuated state, in which the catch 18 will not be engaging a corresponding detent in the receptacle (not shown) and the connector assembly may be inserted into and released from the receptacle. When no force is exerted on the user interface portion 30, and the arm portion 35 thus is returned to—and maintained in—its lower position by the biasing member 25, the connector assembly is in an unactuated and locked state, in which the catch 18 is engaging a corresponding detent in the receptacle (not shown), and charging of the EV may take place. Whether the connector assembly 1 is in an actuated and releasable state (in which charging may not take place) or in an unactuated and locked state (in which charging is possible), is communicated to the PCB 7 via a switch activation member 10 arranged on the underside of the arm portion 35. The switch activation member 10 operates the PCB switch 8 by pressing the plunger 14.

Figure 10A:
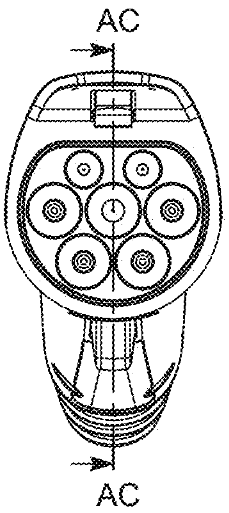
FIG. 10A is a front view of the connector assembly illustrated in FIG. 1, in an unactuated (locking) state.
Figure 10B:
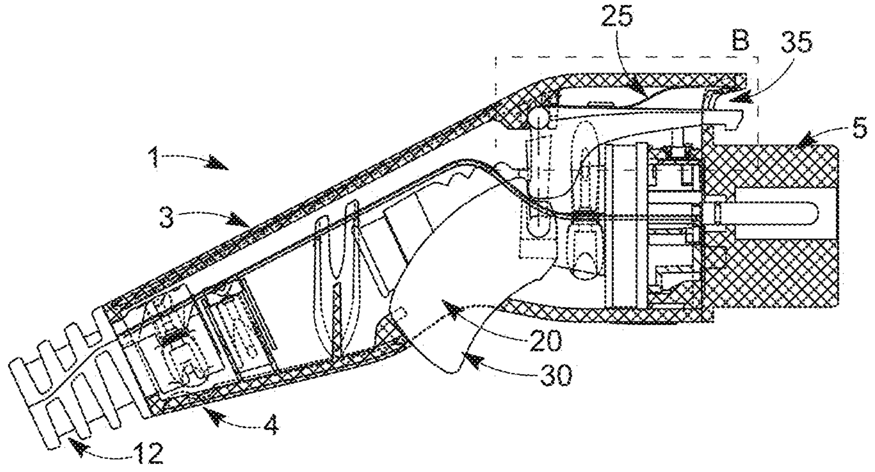
FIG. 10B is a sectional drawing along section AC in FIG. 10A.

FIGS. 10A and 10B illustrate the connector assembly 1 in an unactuated (locking) state, in which the trigger is not depressed and the latch member and associated arm portion are forced towards the lower (locking) position by the biasing member 25, and the switch activation member 10 is pressing against the plunger 14. The lower (locking) position for the latch member 16 is thus consistent with an activation of the PCB switch, by means of the activation member 10. FIG. 12 illustrates the state illustrated by FIG. 10B, but the biasing member is shown as a coil spring 25'. It should be understood that the biasing member may be any element or device serves to force the arm portion towards the lower position as illustrated in FIGS. 10 and 12.

Figure 11A:
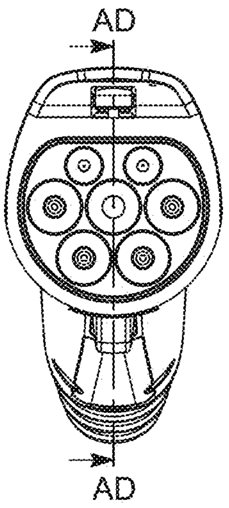
FIGS. 11A and 11B correspond to FIGS. 10A and 10B, respectively, but illustrates the connector assembly in an actuated (releasing) state.
Figure 11B:
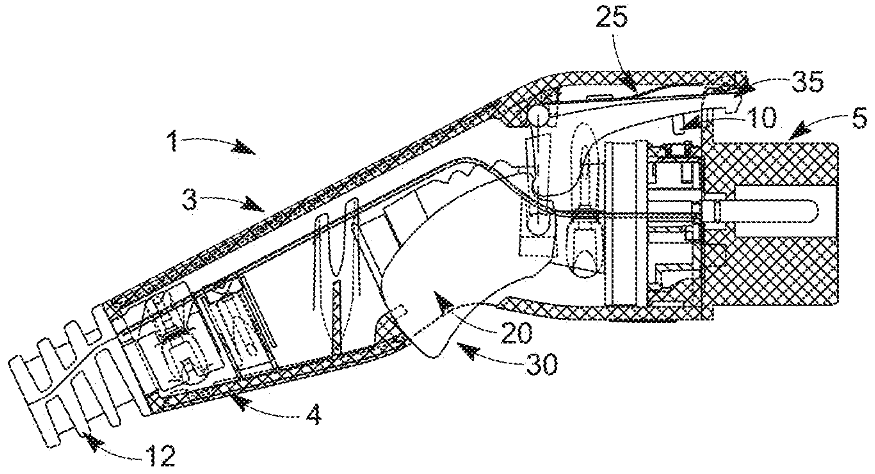

FIGS. 11A and 11B illustrate the connector assembly 1 in an actuated (releasing) state, in which the trigger 20 is depressed to overcome the force exerted by the biasing member 25, and the latch member and associated arm portion are forced towards the upper (releasing) position, and the switch activation member 10 is not pressing against the plunger 14.

The trigger 20 and the latch member 16 are unitary objects, as the drawings indicate, and are formed (e.g. cast) of a suitable material. The direct transfer of rotational moments between these two objects, and the absence of intermediate pushrods and other linkages, provides for a reliable and durable mechanism. By virtue of the design of the trigger and the latch mechanism as described above, mechanical features and electrical components are isolated from one another.

The invention provides a simplified and quicker assembly process, compared to connector assemblies of the prior art. The trigger 20 is installed in the lower housing part 4 and rotatably supported in the trigger supports 4*a,b*, as described above. The electrical components are connected and sealed inside the grommet 13 as described above, and placed in the lower housing part 4, including the trigger (first) cavity 32 (see FIG. 6B). This assembly stage is illustrated in FIG. 8. The latch member 16 is installed in the upper housing part 3 and rotatably supported in the latch supports 3*a,b*, as described above. Finally, the assembly comprising the upper housing part and the latch member is mated with the lower housing part, and the two housing parts are interconnected.

The invention claimed is:

1. A connector assembly, comprising:

a connector body configured for insertion into a receptacle;

a cable having one or more electrical connector members, and the connector body is configured for receiving the one or more connector members;

a first housing part and a second housing part configured for connection to each other and to respective portions of the connector body and the cable to form a housing of the connector assembly;

a latch member having an arm portion with a catch at its free end, said catch being configured for releasable interconnection with a detent member in said receptacle, said latch member being movable between a locking position and a releasing position; characterized by:

a trigger having a user interface portion, and comprising first support means for rotatable installation in corresponding trigger supports in the first housing part;

the latch member comprising second support means for rotatable installation in corresponding latch supports in the second housing part;

the trigger comprising two trigger sections that extend upwards from the user interface portion and define a first cavity, wherein the trigger sections comprise respective first shaped portions at their upper ends;

the latch member comprising two latch sections that extend downwards from the arm portion and define a second cavity, wherein the latch sections comprise respective second shaped portions at their lower ends;

said first and second shaped portions having complementary surfaces and configured for movable abutting connection when the connector assembly is assembled, and thereby defining rotatable joints;

whereby rotational movement of the trigger causes rotational movement of the latch member, and vice versa.

2. The connector assembly of claim 1, further comprising a grommet which is connected to a portion of the cable and to a portion of the connector body and encloses said electrical connector members and other electrical components inside the connector assembly.

3. The connector assembly of claim 2, wherein said joints are arranged outside said grommet.

4. The connector assembly of claim 2, wherein the first cavity is configured for receiving at least a portion of said grommet, and said joints are formed on each side of the grommet.

5. The connector assembly of claim 1, further comprising a biasing member configured for forcing the latch member towards the locking position.

6. The connector assembly of claim 1, wherein the first and second housing parts are lower and upper housing parts when the connector assembly is inserted into a receptacle, and the lower housing part comprises an opening which configured for receiving at least a portion of the user interface portion, said opening is facing downwards when the connector assembly is inserted into a receptacle.

7. The connector assembly of claim 1, further comprising a printed circuit board (PCB) configured for controlling electrical power and signals, a switch configured for operating the PCB, and a plunger for activating the switch, and wherein the arm portion comprises a switch activation member configured for operating the PCB by pressing the plunger.

8. A method of assembling the connector assembly as defined by claim 1, comprising installing the trigger in the first housing part; connecting the electrical connector members to the cable and the connector body to form a unit; arranging said unit in the first housing part;

installing the latch member in the second housing part; and connecting the first and second housing parts.

9. The method of claim 8, wherein the arranging step comprises arranging a portion of said unit in the first cavity.

10. The method of claim 8, further comprising enclosing the electrical connector members, a portion of the connector body, and a portion of the cable by a grommet.

* * * * *